(12) United States Patent
Nakamura

(10) Patent No.: US 6,479,420 B2
(45) Date of Patent: Nov. 12, 2002

(54) CERAMICS AND THEIR POWER FOR SCINTILLATORS, AND METHOD FOR PRODUCING SAME

(75) Inventor: Ryouhei Nakamura, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 8 days.

(21) Appl. No.: 09/827,180

(22) Filed: Apr. 6, 2001

(65) Prior Publication Data

US 2002/0013215 A1 Jan. 31, 2002

(30) Foreign Application Priority Data

Apr. 6, 2000 (JP) ........................... 2000-104614
Nov. 16, 2000 (JP) ........................... 2000-350213

(51) Int. Cl.[7] ................ C04B 35/50; C04B 35/115; C04B 35/44
(52) U.S. Cl. ................ 501/152; 501/86; 501/153; 501/154; 501/127; 501/128; 252/301.4 F; 252/301.4 R; 252/582; 252/584; 264/21; 264/653; 264/654; 264/655
(58) Field of Search ................ 501/86, 152, 153, 501/154, 127, 128; 252/301.4 F, 301.4 R, 582, 584; 264/21, 653, 654, 655

(56) References Cited

U.S. PATENT DOCUMENTS 5,484,750 A * 1/1996 Greskovich et al. .. 252/301.4 F

FOREIGN PATENT DOCUMENTS

JP 2-283663 11/1990
WO WO99/33934 7/1999

* cited by examiner

Primary Examiner—Elizabeth D. Wood
(74) Attorney, Agent, or Firm—Finnegan, Henderson, Farabow, Garrett & Dunner, L.L.P.

(57) ABSTRACT

A sintered ceramic for a scintillator having a composition represented by the general formula of $Gd_{3-x}Ce_xAl_ySi_zGa_{5-y-z}O_{12}$, wherein $0.001 \leq x \leq 0.05$, $1 \leq y \leq 4$, and $0.0015 \leq z \leq 0.03$, is produced by mixing gadolinium oxide, aluminum oxide, gallium oxide, a cerium salt, a silicon compound and a fluorine compound in such proportions as to provide the above composition; calcining the resultant mixture at a temperature of 1400–1600° C.; disintegrating the resultant calcined body to ceramic powder; pressing the ceramic powder to provide a green body; and sintering the green body at a temperature of 1600–1700° C. in a non-oxidizing atmosphere at $5\times10^4$ Pa or more, and optionally further by hot isostatic pressing at a temperature of 1400–1600° C. in an argon atmosphere.

6 Claims, 4 Drawing Sheets y ($Gd_{2.995}Ce_{0.005}Al_ySi_{0.003}Ga_{4.997-y}O_{12}$)

0.001mol/mol x ($Gd_{3-x}Ce_xAl_{2.997}Si_{0.003}Ga_2O_{12}$)

Calcining Temperature (°C)

CERAMICS AND THEIR POWER FOR SCINTILLATORS, AND METHOD FOR PRODUCING SAME

FIELD OF THE INVENTION

The present invention relates to a ceramic, ceramic powder for scintillators for use in radioactive ray detectors for detecting X-ray, and a method for producing such ceramic and its powder.

PRIOR ART

Scintillators are materials emitting visible light upon receiving radioactive rays. Because the intensity of radioactive rays is in a proportional relation to the amount of light emitted from the scintillator, radioactive rays can be measured by a combination of the scintillator and a photodetector. Such technology is utilized mainly in medical apparatuses such as X-ray CTs, analysis apparatuses, non-destructive inspection apparatuses utilizing radioactive rays, apparatuses for detecting leaked radioactive rays, etc.

The scintillators are required to have properties such as high sensitivity to radioactive rays, high material uniformity and chemical stability. Further, when scintillators are used in apparatuses for rapidly detecting the changes of the intensity of radioactive rays such as X-ray CTs, it is important that they have a small attenuation time constant, which is defined as an elapsed time period until the luminescence intensity is attenuated to 1/e after the stop of irradiation, and a small afterglow, which is glow continuing after the stop of irradiation. Such scintillators are single crystals such as $CdWO_4$, polycrystalline ceramics such as $Gd_2O_2S:Pr,Ce,F$, $(Gd, Y)_2O_3:Eu,Pr$, $Gd_3Ga_5O_{12}:Cr,Ce$, etc.

Among these scintillators, the single crystal $CdWO_4$ scintillator is disadvantageous in that it does not provide high luminescence intensity, that it cannot easily be worked because of cleavage, and that it contains a highly toxic ion of Cd. Though $Gd_2O_2S:Pr,Ce,F$ has a high luminescence efficiency with small attenuation time constant and afterglow, it is disadvantageous in that it is produced through complicated processes, resulting in high production cost. Though $(Gd, Y)_2O_3:Eu,Pr$ provides high luminescence intensity, it suffers from extremely large attenuation time constant. Also, $Gd_3Ga_5O_{12}:Cr,Ce$ is poor in luminescence intensity. The properties of these scintillators are shown in Table 1 below.

Accordingly, it has been desired to provide an inexpensive ceramic for a scintillator capable of providing high luminescence intensity with small attenuation time constant and afterglow.

OBJECT OF THE INVENTION

Accordingly, an object of the present invention is to provide an inexpensive, oxide-type ceramic and its powder for a scintillator capable of providing high luminescence intensity with small attenuation time constant and afterglow.

Another object of the present invention is to provide a method for producing such an oxide-type ceramic and its powder for a scintillator at a low cost.

SUMMARY OF THE INVENTION

As a result of investigations on various oxide-type ceramics for scintillators in view of the above objects, the inventors have found that a garnet composition of $(Gd, Ce)_3(Al, Si, Ga)_5O_{12}$ emits a high intensity of luminescence. This garnet composition can provide a sintered body having a cubic crystal structure with small optical anisotropy and high transmittancy.

Thus, the ceramic for a scintillator according to the present invention has a composition represented by the general formula:

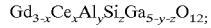
$Gd_{3-x}Ce_xAl_ySi_zGa_{5-y-z}O_{12}$;

wherein $0.001 \leq x \leq 0.05$, $1 \leq y \leq 4$, and $0.0015 \leq z \leq 0.03$.

The method for producing a ceramic powder having the above composition for a scintillator according to the present invention comprises the steps of mixing gadolinium oxide, aluminum oxide, gallium oxide, a cerium salt, a silicon compound and a fluorine compound in such proportions as to provide the above composition; and calcining the resultant mixture at a temperature of 1400–1600° C.

The fluorine compound is preferably barium fluoride. Each of gadolinium oxide, aluminum oxide and gallium oxide preferably has an average diameter of 0.1–5 μm.

The method for producing a sintered ceramic having the above composition for a scintillator comprises the steps of mixing gadolinium oxide, aluminum oxide, gallium oxide, a cerium salt, a silicon compound and a fluorine compound in such proportions as to provide the above composition; calcining the resultant mixture at a temperature of 1400–1600° C.; disintegrating the resultant calcined body to ceramic powder; pressing the ceramic powder to provide a green body; and sintering the green body at a temperature of 1600–1700° C. in a non-oxidizing atmosphere at $5 \times 10^4$ Pa or more.

The sintered ceramic may further be subjected to hot isostatic press sintering at a temperature of 1400–1600° C. in an argon atmosphere.

DESCRIPTION OF PREFERRED EMBODIMENTS

In the ceramic for a scintillator of the present invention having a composition of $Gd_{3-x}Ce_xAl_ySi_zGa_{5-y-z}O_{12}$, a luminescent element that emits visible light upon receiving radioactive rays is Ce. $Ce^{3+}$ substituted for part of $Gd^{3+}$ undergoes transition of 5d→4f, causing luminescence at an extremely small attenuation time constant of several tens to several hundreds of nanoseconds. Si functions to make $Ce^{3+}$ having a large ion radius to easily dissolve in the matrix of the ceramic, thereby improving the sinterability of the ceramic.

To investigate the dependence of luminescence intensity on the composition of a ceramic for a scintillator, the amount of each element was changed in a ceramic obtained from $Gd_2O_3$, $Al_2O_3$, $Ga_2O_3$, $SiO_2$, $BaF_2$ and a cerium salt such as cerium nitrate by ball-milling and calcining at 1500° C. for 2 hours in an alumina crucible with an alumina lid.

Figure 1:
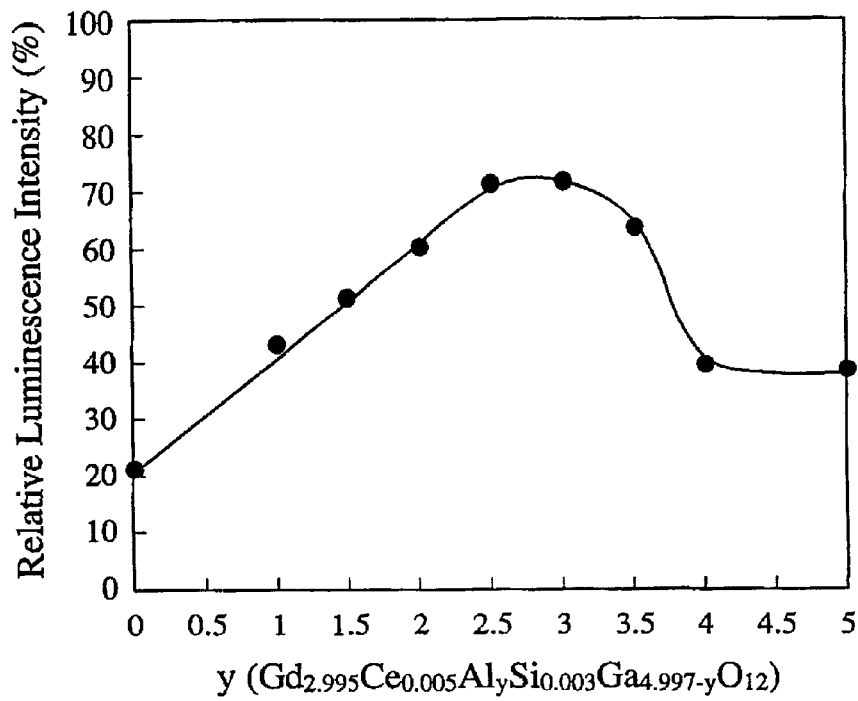
FIG. 1 is a graph showing the relation between the amount (y) of Al in a ceramic scintillator powder of $Gd_{2.995}Ce_{0.005}Al_ySi_{0.003}Ga_{4.997-y}O_{12}$ and a relative luminescence intensity.

First, to investigate the influence of Al and Ga on luminescence intensity, a powdery ceramic having a composition of $Gd_{2.995}Ce_{0.005}Al_ySi_{0.003}Ga_{4.997-y}O_{12}$ with a variable ratio of Al to Ga was prepared in the same manner as above. This ceramic exhibits luminescence intensity, which is a relative value to that of $Gd_2O_2S:Pr,Ce,F$, as shown in FIG. 1. In this ceramic composition, a relatively large luminescence intensity is achieved at $y=1-4$, with a peak at $y=3$.

Figure 2:
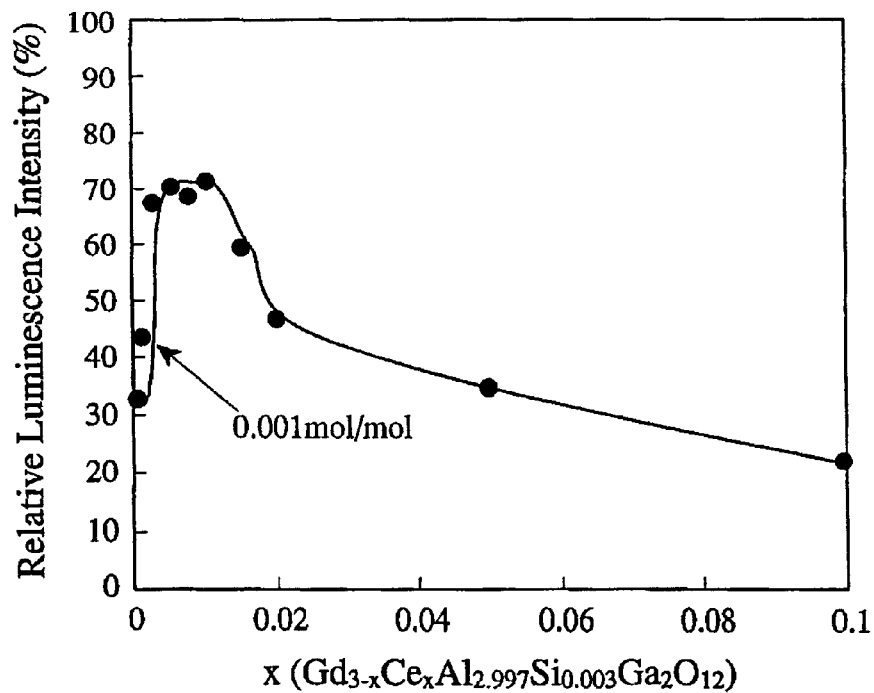
FIG. 2 is a graph showing the relation between the amount (x) of Ce in a ceramic scintillator powder of $Gd_{3-x}Ce_xAl_{2.997}Si_{0.003}Ga_2O_{12}$ and a relative luminescence intensity.

FIG. 2 shows the dependence of luminescence intensity on Ce, a luminescent element, in a composition of $Gd_{3-x}Ce_xAl_{2.997}Si_{0.003}Ga_2O_{12}$. Though the luminescence intensity does not largely depend on the concentration of Ce, the range of x providing sufficient luminescence intensity is 0.001–0.05. the preferred range of x is 0.002–0.02.

Figure 3:
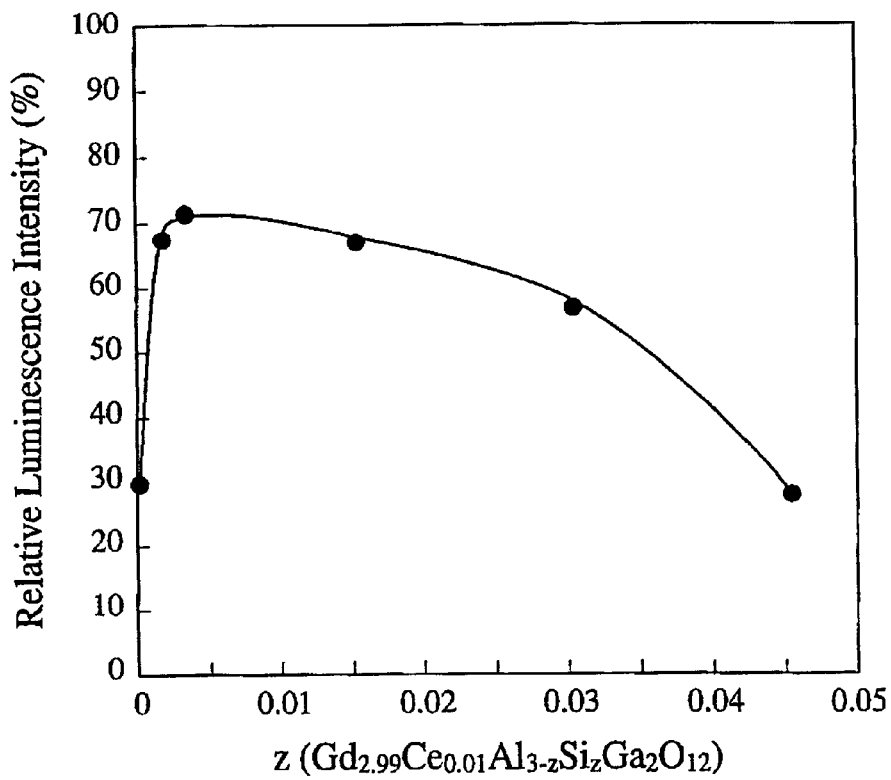
FIG. 3 is a graph showing the relation between the amount (z) of Si in a ceramic scintillator powder of $Gd_{2.99}Ce_{0.01}Al_{3-z}Si_zGa_2O_{12}$ and a relative luminescence intensity.

FIG. 3 shows the influence of Si added on luminescence intensity. Si may preferably be added in the form of ethyl silicate $[Si(OC_2H_5)_4]$ or $SiO_2$. When Si is less than 0.0015 in the composition of $Gd_{2.99}Ce_{0.01}Al_{3-z}Si_zGa_2O_{12}$, there is substantially no effect of improving a sintering density. On the other hand, when Si exceeds 0.03, the luminescence intensity decreases remarkably.

Preferable as a fluorine compound is barium fluoride ($BaF_2$). $BaF_2$ acts as a sintering aid, forming a liquid phase during calcining, making it less likely to generate lattice defects in the matrix and thus providing the resultant ceramic with improved luminescence intensity. The amount of $BaF_2$ added is preferably 0.1–1 mol per 1 mol of the matrix composition of $Gd_{3-x}Ce_xAl_ySi_zGa_{5-y-z}O_{12}$. Because Ba is washed away with hydrochloric acid, and because F is evaporated during calcining and sintering, the amounts of Ba and F remaining in a ceramic obtained from starting materials including $BaF_2$ are insignificant. In other words, if Ba and F remain in the ceramic, their amounts are so small that they do not substantially affect luminescence characteristics of the ceramic.

Figure 4:
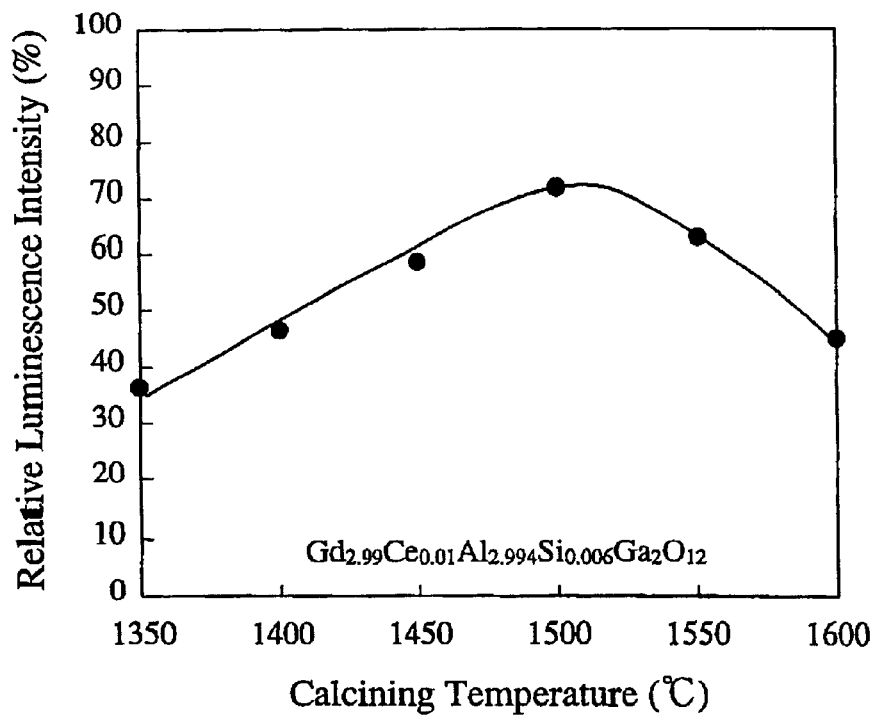
FIG. 4 is a graph showing the relation between a calcining temperature for producing a ceramic scintillator powder of $Gd_{2.99}Ce_{0.01}Al_{2.994}Si_{0.006}Ga_2O_{12}$ and a relative luminescence intensity.

FIG. 4 shows the dependence of the luminescence intensity on a calcining temperature. It is clear from FIG. 4 that the calcining temperature should be 1400–1600° C. to provide a ceramic for a scintillator having high luminescence intensity.

Figure 5:
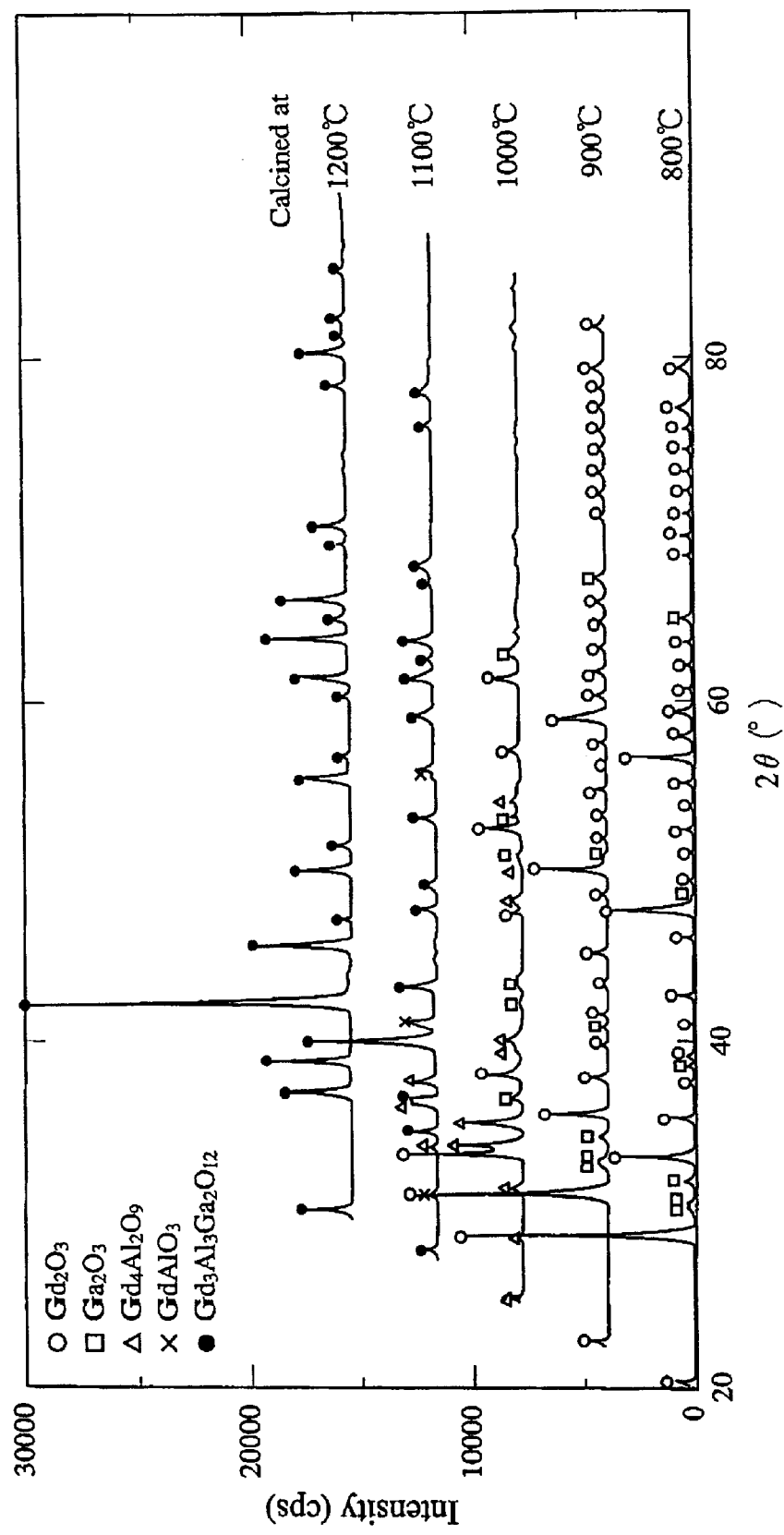
FIG. 5 is a graph showing X-ray diffraction patterns at various calcining temperatures.
Figure 6:
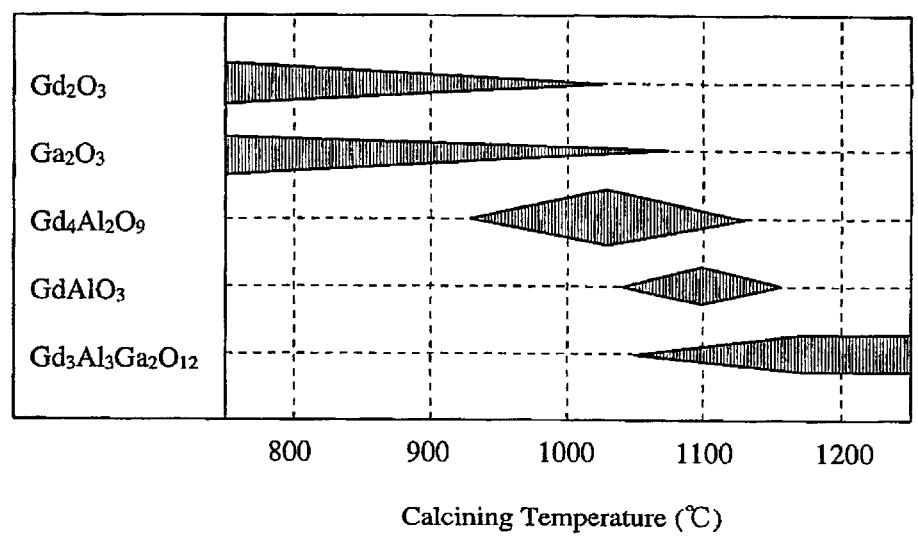
FIG. 6 is a view showing phases generated at various calcining temperatures.

A polycrystalline garnet scintillator of $(Gd, Ce)_3(Al, Si, Ga)_5O_{12}$ is not likely to have a single phase, having perovskite phases of $GdAlO_3$ or $GdGaO_3$ or similar phases precipitated. It has been found as shown in FIG. 5 that when $\gamma$-$Al_2O_3$ powder of 0.6 $\mu$m in average diameter is used, $Gd_4Al_2O_9$ is formed at a temperature of 950° C. or higher and transformed to $GdAlO_3$ at a temperature of 1050° C. or higher, remaining as an undesirable phase. Because $\gamma$-$Al_2O_3$ has a small X-ray diffraction intensity due to low crystallinity, it does not appear in the X-ray diffraction patterns in FIG. 5. The relations of phases precipitated and a calcining temperature are shown in FIG. 6.

When $Al_2O_3$ powder of 6 $\mu$m in average diameter is used, on the other hand, it has been confirmed that a $GdGaO_3$ phase remains. The same tendency is appreciated on gadolinium oxide and gallium oxide. It has thus been concluded that each of the gadolinium oxide, the aluminum oxide and the gallium oxide should have an average diameter of 0.1–5 $\mu$m.

The calcined scintillator powder has an average diameter of 10 $\mu$m or more. Though this powder may be directly sintered, it is preferable to make this powder to fine powder of 1 $\mu$m or less in average diameter by ball milling with alumina balls or jet milling before sintering. The pulverized powder is preferably subjected to monoaxial pressing or a combination of monoaxial pressing and cold-isostatic pressing to provide a green body having a relative density of 60–70%. This green body is sintered at 1600–1700° C. in an atmosphere of nitrogen, argon or helium in an aluminum sagger with an alumina lid to provide a primarily sintered body having a relative density of 95–98%.

Though vacuum sintering is used in other ceramics, sintering in vacuum or at pressure of less than $5 \times 10^4$ Pa is not preferable for the ceramic scintillator of the present invention, because too much Ga is evaporated under such conditions. Also, sintering in hydrogen is not preferable, because a strong reducing function of hydrogen causes metallic Ga to precipitate, failing to achieve good sintering.

When the sintering temperature is lower than 1600° C,. an improved sintering density cannot be obtained, leaving open pores. On the other hand, when the sintering temperature is higher than 1700° C., too much Ga is evaporated, failing to control the composition of the ceramic.

The resultant sintered body has a relative density of 95–98% without open pores, though it has a low light transmittance and thus insufficient luminescence intensity. Thus, this primarily sintered body is preferably further subjected to hot-isostatic press (HIP) sintering at 1400–1600° C. in an argon gas at $5 \times 10^7$ Pa to $2 \times 10^8$ Pa to provide a sintered body having a relative density of 99.7% or more with excellent optical transparency.

The present invention will be described in detail referring to EXAMPLES below without intention of limiting the present invention thereto.

EXAMPLE 1

Comparative Examples 1-3

135.48 g of $Gd_2O_3$, 0.883 g of $Ce_2(C_2O_4)_3 \cdot 9H_2O$, 38.16 g of $Al_2O_3$, 0.31 g of $Si(OC_2H_5)_4$, 50.61 g of $Ga_2O_3$, and 21.92 g of $BaF_2$ were wet-mixed by a ball mill and dried. The resultant mixed powder was charged into an alumina crucible of a B5 size with an alumina lid, and calcined at 1500° C. for 2 hours. After cooling, the calcined mixture was disintegrated, washed with 4N-hydrochloric acid for 2 hours with a stirrer, and then with pure water and dried. The mixture was ball-milled for 24 hours together with alumina balls of 5 mm in diameter (purity: 99.9%) in a polyethylene pot to provide pulverized scintillator powder of 0.7 $\mu$m in average diameter. This powder was mixed with 5% by weight of pure water and then monoaxially pressed at pressure of 500 kg/cm². It was then subjected to cold-isostatic pressing at pressure of 3 tons/cm² to provide a green body having a relative density of 64%.

This green body was charged into an alumina sagger with an alumina lid and subjected to a primary sintering at 1700° C. for 3 hours in a nitrogen atmosphere to provide a sintered body having a relative density of 98%. To provide the sintered body with a high, uniform density, a temperature elevation speed at a temperature of 1350° C. or higher was set at 50° C./hour. This primarily sintered body was subjected to hot-isostatic pressing at 1500° C. and $1 \times 10^8$ Pa for 3 hours to provide a final sintered body having a relative density of 99.9%. The characteristics of the final sintered body (EXAMPLE 1) are shown in Table 1 together with those of conventional scintillator ceramics of $CdWO_4$ (COMPARATIVE EXAMPLE 1), $(Gd, Y)_2O_3:Eu,Pr$ (COMPARATIVE EXAMPLE 2) and $Gd_2O_2S:Pr,Ce,F$ (COMPARATIVE EXAMPLE 3).

Further, there is strong demand to provide X-ray CTs rapidly finding wider applications at a low price. Known scintilla-

TABLE 1

| No. | Material | Crystal System | Density ($g/cm^3$) | Main Wavelength of Luminescent Light (nm) | Relative Luminescence Intensity (%) | Attenuation Time Constant ($\mu s$) | Afterglow After 30 ms (%) | Cost* |
|---|---|---|---|---|---|---|---|---|
| EXAMPLE 1 | $Gd_{2.99}Ce_{0.01}Al_{2.994}Si_{0.006}Ga_2O_{12}$ | Cubic | 6.55 | 550 | 180 | <1 | 0.01 | nearly 1 |
| COM. EX. 1 | $CdWO_4$ | Monoclinic | 7.99 | 480 | 100 | 5.0 | 0.002 | 1 |
| COM. EX. 2 | $(Gd, Y)_2O_3:Eu,Pr$ | Cubic | 5.92 | 610 | 180 | 1000 | 0.01 | nearly 1 |
| COM. EX. 3 | $Gd_2O_2S:Pr,Ce,F$ | Hexagonal | 7.28 | 512 | 200 | 3.0 | 0.01 | nearly 3 |

Note: *The cost of each sample is expressed by a relative value to that of COMPARATIVE EXAMPLE 1.

After machining the final sintered body to a 3.0-mm-thick wafer shape, its was evaluated with respect to the following properties:
(1) Diffusion transmittance at 550 nm by an integrating-sphere photometer,
(2) Relative luminescence intensity at X-ray irradiation with a W target at a tube voltage of 120 kV and tube current of 5 mA (expressed by percentage relative to the luminescence intensity of a $CdWO_4$ scintillator),
(3) Afterglow after 30 ms from stopping X-ray excitation, and
(4) Luminescence attenuation time constant at γ-ray irradiation from $^{241}Am$ at 60 keV.

The measurement results are shown in Table 2.

EXAMPLES 2-8

Comparative Examples 4-7

Sintered bodies having compositions shown in Table 2 were produced in the same manner as in EXAMPLE 1 except for changing the percentages of $Al_2O_3$, ethyl silicate and $Ga_2O_3$, the calcining temperature and the sintering temperature. The diffusion transmittance, relative luminescence intensity, attenuation time constant and afterglow of each of the resultant ceramic scintillators are shown in Table 2. Those sintered in vacuum or in an atmosphere at less than $5 \times 10^4$ Pa suffered from extreme evaporation of Ga, resulting in a relative density of less than 90%.

tors shown in Table 1 fail to meet such demand. The scintillator of the present invention is a composite oxide which has properties similar to those of a ceramic scintillator of $Gd_2O_2S:Pr,Ce,F$, and which is produced at substantially the same cost as $CdWO_4$ and $(Gd, Y)_2O_3:Eu,Pr$. On the contrary, the scintillators of COMPARATIVE EXAMPLES 4-5 outside the scope of the present invention exhibit a low relative luminescence intensity with high afterglow.

As described in detail above, the present invention provides a ceramic for a scintillator having higher properties than those of the conventional ones at a low cost.

What is claimed is:

1. A ceramic for a scintillator having a composition represented by the general formula of $Gd_{3-x}Ce_xAl_ySi_zGa_{5-y-z}O_{12}$, wherein $0.001 \leq x \leq 0.05$, $1 \leq y \leq 4$, and $0.0015 \leq z \leq 0.03$.

2. A method for producing a ceramic powder for a scintillator having a composition represented by the general formula of $Gd_{3-x}Ce_xAl_ySi_zGa_{5-y-z}O_{12}$, wherein $0.001 \leq x \leq 0.05$, $1 \leq y \leq 4$, and $0.0015 \leq z \leq 0.03$, comprising the steps of mixing gadolinium oxide, aluminum oxide, gallium oxide, a cerium salt, a silicon compound and a fluorine compound in such proportions as to provide said composition; and calcining the resultant mixture at a temperature of 1400–1600° C.

3. The method for producing a ceramic powder for a scintillator according to claim 2, wherein said fluorine compound is barium fluoride.

4. The method for producing a ceramic powder for a scintillator according to claim 2 or 3, wherein each of said

TABLE 2

| No. | Composition | Sintering Temp. (° C.) | HIP Temp. (° C.) | Diffusion Transmittance at 550 nm (%) | Relative Luminescence Intensity (%) | Attenuation Time Constant ($\mu s$) | Afterglow After 30 ms (%) |
|---|---|---|---|---|---|---|---|
| EX. 1 | $Gd_{2.99}Ce_{0.01}Al_{2.994}Si_{0.006}Ga_2O_{12}$ | 1700 | 1500 | 65 | 180 | <1 | 0.01 |
| EX. 2 | $Gd_{2.99}Ce_{0.01}Al_{0.997}Si_{0.003}Ga_4O_{12}$ | 1700 | 1500 | 64 | 130 | <1 | 0.01 |
| EX. 3 | $Gd_{2.99}Ce_{0.01}Al_{3.997}Si_{0.003}GaO_{12}$ | 1700 | 1500 | 65 | 135 | <1 | 0.01 |
| EX. 4 | $Gd_{2.99}Ce_{0.01}Al_{2.997}Si_{0.003}Ga_2O_{12}$ | 1700 | 1500 | 63 | 145 | <1 | 0.01 |
| EX. 5 | $Gd_{2.99}Ce_{0.01}Al_{2.997}Si_{0.003}Ga_2O_{12}$ | 1700 | 1500 | 60 | 130 | <1 | 0.02 |
| EX. 6 | $Gd_{2.99}Ce_{0.01}Al_{2.9985}Si_{0.0015}Ga_2O_{12}$ | 1700 | 1500 | 61 | 170 | <1 | 0.01 |
| EX. 7 | $Gd_{2.99}Ce_{0.01}Al_{2.97}Si_{0.003}Ga_2O_{12}$ | 1700 | 1500 | 66 | 150 | <1 | 0.03 |
| EX. 8 | $Gd_{2.99}Ce_{0.01}Al_{2.985}Si_{0.015}Ga_2O_{12}$ | 1600 | 1500 | 60 | 160 | <1 | 0.02 |
| COM. EX. 4 | $Gd_{2.99}Ce_{0.01}Al_{0.494}Si_{0.006}Ga_{4.5}O_{12}$ | 1700 | 1500 | 63 | 100 | <1 | 0.01 |
| COM. EX. 5 | $Gd_{2.99}Ce_{0.01}Al_{2.997}Si_{0.003}Ga_2O_{12}$ | 1700 | 1500 | 56 | 95 | <1 | 0.02 |
| COM. EX. 6 | $Gd_{2.99}Ce_{0.01}Al_{2.955}Si_{0.045}Ga_2O_{12}$ | 1700 | 1500 | 65 | 135 | <1 | 0.05 |
| COM. EX. 7 | $Gd_{2.99}Ce_{0.01}Al_{2.997}Si_{0.003}Ga_2O_{12}$ | 1550 | 1500 | 30 | 90 | <1 | 0.01 |

Extremely important for scintillators used for apparatuses such as X-ray CTs for detecting the intensity change of radioactive rays at a high speed is that the scintillators have high luminescence intensity to radioactive rays with small luminescence attenuation time constant and afterglow.

gadolinium oxide, said aluminum oxide and said gallium oxide has an average diameter of 0.1–5 $\mu m$.

5. A method for producing a sintered ceramic for a scintillator having a composition represented by the general formula of $Gd_{3-x}Ce_xAl_ySi_zGa_{5-y-z}O_{12}$, wherein $0.001 \leq x \leq 0.05$, $1 \leq y \leq 4$, and $0.0015 \leq z \leq 0.03$, comprising the steps of mixing gadolinium oxide, aluminum oxide, gallium oxide, a cerium salt, a silicon compound and a fluorine compound in such proportions as to provide said composition; calcining the resultant mixture at a temperature of 1400–1600° C.; disintegrating the resultant calcined body to ceramic powder; pressing said ceramic powder to provide a green body; and sintering said green body at a temperature of 1600–1700° C. in a non-oxidizing atmosphere at $5 \times 10^4$ Pa or more.

6. The method for producing a sintered ceramic for a scintillator according to claim 5, wherein said primarily sintered ceramic is further subjected to hot isostatic press sintering at a temperature of 1400–1600° C. in an argon atmosphere.

* * * * *

UNITED STATES PATENT AND TRADEMARK OFFICE
CERTIFICATE OF CORRECTION

PATENT NO.    : 6,479,420 B2
DATED         : November 12, 2002
INVENTOR(S)   : Ryouhei Nakamura It is certified that error appears in the above-identified patent and that said Letters Patent is hereby corrected as shown below:

<u>Title page,</u>
Item [54], Title, "POWER" should read -- POWDER --.

Signed and Sealed this

Fourth Day of March, 2003

JAMES E. ROGAN
*Director of the United States Patent and Trademark Office*